Patented Feb. 12, 1935

1,991,107

UNITED STATES PATENT OFFICE 1,991,107

CELLULOSE ACETATE-CARBAMATE

Carl J. Malm and Gale F. Nadeau, Rochester, N. Y., assignors to Eastman Kodak Company, Rochester, N. Y., a corporation of New York No Drawing. Application April 27, 1932, Serial No. 607,886

5 Claims. (Cl. 260—101)

The present invention relates to the preparation of cellulose derivatives containing acetyl and carbamyl groups by reacting upon an acetyl containing cellulose with an alkyl or aryl iso-cyanate, either of the normal or thio variety.

In U. S. Patent No. 1,357,450 to Goissedet, it is disclosed that cellulose may react with phenyl isocyanate in the presence of heat; however, the products of that process are insoluble in practically every common organic solvent except possibly pyridine, in which they swell or may even dissolve, in the proportions of 1 part product to 10 of pyridine, forming a semi-gel. Due to these limited solubilities the product of that known process has never found commercial application in spite of the fact that it has been disclosed in the prior art for well over a decade.

An object of our invention is to provide a product which is soluble in most, if not practically all, of the organic solvents commonly employed at this time for colloidizing cellulose derivatives. As a consequence, contrary to the prevailing opinion regarding carbamic acid esters of cellulose, the products of the present invention are valuable commercial products which may be converted from its solutions to filaments, sheets or skins, laminated articles, reinforced fabrics, etc. by known processes.

Another object of our invention is to provide a process in which an ordinary commercial acetyl-containing ester of cellulose may be employed as the starting material in the process. From an economic standpoint the use of an ordinary commercial product as the starting material instead of some uncommon derivative of cellulose greatly lessens the cost of the final product than would be the case if an expensive starting material were employed. Due to this fact the final product of the present invention costs but little more to produce than the products of little or no utility produced according to the disclosure of U. S. Patent No. 1,357,450 in which cotton is employed as the starting material.

Another object of our invention is to provide esters of cellulose which are highly resistant to moisture and to alkalies and which have a high stability. Cellulose esters which are unaffected by both moisture and alkalies are unusual and can be subjected to various and sundry uses, to which many of the ordinary cellulose esters are not adapted. By high stability is meant the property of resisting degradation and ageing which occurs in the case of some esters of cellulose in a comparatively short period. The degradation of a cellulose ester in sheet form is evidenced by the increasing brittleness of the sheet. Sheets prepared from the esters produced according to our invention however, unless the starting material employed is degraded or contains combined sulfuric acid, will retain their original flexibility for practically an indefinite period of time under ordinary conditions such as are associated with everyday use.

We have found that an acetyl derivative of cellulose such as cellulose acetate or cellulose acetate-propionate if dissolved and treated with an organic iso-cyanate, either of the oxygen containing or the sulfur containing variety, at an elevated temperature will form a cellulose ester having a wide solubility range, resistance to moisture and alkali, and good stability.

The following examples illustrate various embodiments of our invention:

Example I 5 lbs. of cellulose acetate having a 40% acetyl content and a precipitation value of 90% was dissolved in 30 lbs. of cyclohexanone. 7½ lbs. of phenyl iso-cyanate was added to the solution, and the entire mass was maintained at a temperature of 50-55° C. for about 4 days. The product formed (cellulose acetate phenyl-carbamate) was isolated by precipitation in methyl alcohol. The product was then washed with methyl alcohol and dried, and was found to be soluble in acetone, methyl acetate, ethyl acetate, ethylene chloride, chloroform, tetrachlorethane, 1:4 dioxan etc. Analysis of the product showed a content of 37% acetyl and 1.1% nitrogen. The precipitation value was 98%.

The precipitation value of a cellulose ester is the percentage of that ester, which from an acetone solution thereof, will precipitate by the conversion of that solution to a mixture of 60% acetone and 40% water by volume (neglecting contraction). This value is clearly described in Sulzer U. S. Patent No. 1,833,136 and is equally applicable to other cellulose esters.

Example II 10 lbs. of cellulose acetate having an acetyl content of 34% was dissolved in 60 lbs. of pyridine. 15 lbs. of phenyl iso-cyanate was then added to the solution and the whole was kept at a temperature of 50-55° C. for two days. The cellulose acetate phenyl-carbamate obtained, upon analysis, showed an acetyl content of 24.3% and a nitrogen content of 3.9%. This ester was soluble in acetone, methyl acetate, ethyl acetate, ethyl lactate, ethylene chloride, tetrachlorethane, 1:4 dioxan, Beta-methoxy ethyl alcohol and Betaethoxy ethyl alcohol. It was also soluble in the following mixtures:

Ethylene chloride-methyl alcohol (4:1), propylene chloride-methyl alcohol (4:1), benzene-methyl alcohol (2:1) and B B' dichlorethyl ether-methyl alcohol.

The precipitation value of the cellulose acetate employed as the starting material in this example was zero; however the cellulose acetate phenyl-carbamate formed showed a precipitation value of 95%.

*Example III*

10 lbs. of cellulose acetate propionate having a propionyl content of 17% and an acetyl content of 26% was dissolved in 50 lbs. of pyridine. 15 lbs. of phenyl iso-cyanate was added to the solution and the mixture was maintained at a temperature of 50-55° C. for 70 hours. The ester formed was isolated from the mass by precipitation and washing with methyl alcohol. The product of this example was a cellulose acetate propionate phenyl-carbamate which analysis showed to have a 21.8% acetyl, 14.5% propionyl and 15.5% phenyl-carbamyl content. It was soluble in the common organic solvents such as acetone, methyl acetate, ethyl acetate butyl acetate, ethylene chloride, propylene chloride, chloroform, Beta-ethoxy ethyl alcohol, benezene-alcohol mixtures, etc.

Instead of preparing esters by our invention with the oxygen containing iso-cyanates, esters may also be prepared by reacting upon an acetyl containing ester of cellulose with a sulfur-containing iso-cyanate, the latter type of compounds being commonly known as iso-thiocyanates. For example a cellulose acetate was dissolved as disclosed in Examples I or II and allyl mustard oil (allyl-iso-thiocyanate, the most common of the iso-thiocyanate esters) was added thereto and the whole was kept at 50-55° C. for about 70 hours. The ester formed was isolated by precipitating and washing with methyl alcohol. Other alkyl or aryl iso-cyanates may be employed in our invention. For example ethyl iso-cyanate or naphthyl iso-cyanate, whether of the oxygen- or sulfur-containing variety, may be employed instead of the compounds of that type used in the above examples and the corresponding esters will be formed. It is to be understood that when the term iso-cyanate is employed herein it is to be regarded as including both the oxygen-containing and the sulfur-containing compounds of this type.

The product of the first example was further investigated to discover the further properties of the esters of cellulose containing acetyl and carbamyl groups. This cellulose acetate phenyl-carbamate was coated out from various solutions in different solvents and in each case gave a clear, brilliant and flexible skin suitable for photographic film or any of the other fine arts in which cellulose acetate sheeting is employed at the present time. The ester obtained in Example I was found to be more stable to alkali than other known cellulose esters. This ester was treated for a time with boiling water but there was no change in either the form or the composition of that material after this treatment, showing stability to boiling water. The "instability factor" of our new ester is only .02 compared to .2-.6 for the ordinary cellulose acetate. This "instability factor" may be defined as the amount of combined acid liberated from 100 grams of the ester when boiled with distilled water for 24 hours. The cellulose acetate phenyl-carbamate prepared according to our invention is more stable to decomposition by heat than is the regular commercial cellulose acetate. Summarizing, the new cellulose esters containing acetyl and carbamyl groups prepared according to our process give (1) clear, brilliant, flexible skins (2) are unusually resistant to aqueous alkali (3) are resistant to boiling water and (4) have a much greater stability to heat than ordinary commercial cellulose acetate.

As was pointed out above these esters may be employed in sheeting form for photographic film, wrapping material, laminated glass etc., in filament form for artificial silk, impregnated into textiles for water resistant cloth, artificial leather, light transmitting sheeting, impregnated into other materials such as paper or the like or the other various uses to which cellulose esters have been put up to the present time. If desired other plastic materials such as cellulose nitrate, acetate or ether, gum, resins, bituminous materials, heavy metal soaps etc., if compatible, may be incorporated in the esters which we have invented.

If desired any of the plasticizers which have been used for cellulose acetate, which may be found to be effective in the case of our new esters may be incorporated therein whether to increase the flexibility, decrease the inflammability, or both.

Any suitable solvent may be employed in our process in place of pyridine or cyclohexanone; however, those solvents are preferred as they are common and well-known, economical and satisfactorily effective. The tertiary bases especially alpha-picoline and quinoline could be employed in the processes carried out according to the present invention instead of pyridine, if desired.

We claim:

1. An acetone-soluble organic acid ester of cellulose containing both acetyl and carbamyl groups.

2. An acetone-soluble organic acid ester of cellulose containing acetyl and phenyl carbamyl groups.

3. An acetone-soluble organic acid ester of cellulose containing acetyl, propionyl and carbamyl groups.

4. An acetone-soluble organic acid ester of cellulose containing acetyl and allyl-thio carbamyl groups.

5. An acetone-soluble organic acid ester of cellulose containing lower fatty acid and carbamyl groups.

CARL J. MALM.
GALE F. NADEAU.